United States Patent [19]
Felkel

[11] 3,913,003
[45] Oct. 14, 1975

[54] COMPACT CONVERTER BUILDING BLOCK SYSTEM

[75] Inventor: Heinrich Felkel, Berlin, Germany

[73] Assignee: Siemens Aktiengesellschaft, Berlin and Munich, Germany

[22] Filed: Oct. 3, 1974

[21] Appl. No.: 511,630

[30] Foreign Application Priority Data
Oct. 31, 1973 Germany............................. 2354663

[52] U.S. Cl................. 321/8 R; 321/27 R; 317/103
[51] Int. Cl.²....................... H02M 7/00; H01L 1/16
[58] Field of Search....... 321/8 R, 11, 27 R; 317/99, 317/103, 256

[56] References Cited
UNITED STATES PATENTS
3,265,934   8/1966   Cuttino............................. 317/103

OTHER PUBLICATIONS
Brown Boveri Rev. 2/3, Vol. 60, pp. 100–107, Feb. – Mar. 1973.

Toshiba Rev. (Int. Ed.) (Japan), No. 65, pp. 7–10, Jan. 1972.

Electronics & Power, "High–Voltage Solid–State Converter Valve for D.C. Transmission," p. 44, Feb. 1972.

*Primary Examiner*—William H. Beha, Jr.
*Attorney, Agent, or Firm*—Kenyon & Kenyon Reilly Carr & Chapin

[57] ABSTRACT

A converter arrangement made up of a plurality of building blocks having elements suitable for mass production in which each support used in making up the total converter framework has at least one carrier made of electrical conducting material designed essentially in the shape of a square cup and connected by screws to vertical support elements of insulating material with at least a portion of the carriers being used for carrying current.

9 Claims, 6 Drawing Figures

COMPACT CONVERTER BUILDING BLOCK SYSTEM

BACKGROUND OF THE INVENTION

This invention relates to converters made up of series connected thyristors assembled together along with circuit components in a framework made up of a plurality of supports in general and more particularly to an improved converter using a system of building blocks for making such a framework.

Converters made up of series connected thyristors assembled, together with circuit components, in a framework containing several supports are commercially available. In particular they find use as d-c to a-c converters, rectifiers or inverters for high voltages up to 5 kV or more. The series connected thyristors can be what is referred to as thyristor stacks or thyristor columns. Typical of such are the ones described in German Offenlegungsschrift No. 1,564,694 and those described in German Offenlegungsschrift No. 1,913,546. The former discloses a liquid cooled thyristor stack and the latter an air cooled thyristor stack. Typically the thyristor stacks are arranged as thyristor groups in various levels above one another. As noted on page 83 of "Silicon Converter Handbook" published by BBC, series connected thyristors with separate wiring should be protected against excessive stresses. As disclosed therein an RCL circuit is used for that purpose. All series connected thyristors of a thyristor column are coupled in common to a cutoff choke with a separate RC member being coupled in parallel to each thyristor of the thyristor column.

Thus, in order to provide the necessary protection a great number of components generally must be arranged within the converter framework of the type described hereinabove. This leads to a large envelope and leads to the fact that commercially available converters usually must be individually constructed. As a result mass production even of individual parts is possible only in a limited number of cases.

In view of these problems it is the object of the present invention to provide a design for a converter of the type described above in which identical components can be used in the manufacture of converters operating at different voltages and to do this using a building block system which is compact and provides a space-saving arrangement.

SUMMARY OF THE INVENTION

The present invention solves this problem by including in each column support used in the converter framework at least one carrier which is in the form of a cup with a plurality of flat surface and which is connected with screws to vertical support elements of electrical insulating material. Furthermore at least some of the carriers are made of electrically conducting material and are used to carry current. In accordance with the preferred embodiment the carriers can be of an essentially square shape.

The framework of the converter according to the present invention is made up of identical carriers connected through screws to insulating vertical support elements. The carriers can be cheaply mass produced preferably as metal castings. All that is required is to provide them with different holes depending on where in the framework they are to be assembled. A converter constructed in this fashion will have a framework made up of a plurality of identical building blocks which can be expanded virtually at random. Furthermore no special training of personnel is required even for the design of a system or for assembly. In the illustrated embodiment a converter having series connected thyristors divided into groups and arranged in several levels one on top of the other is illustrated. For such an arrangement it is preferred that each support column have a carrier for each level and that the carriers of each column be screwed to each other through vertical support elements of electrically insulating material. With a converter designed in this manner the building block system becomes particularly advantageous. All that must be determined is the number of thyristors to be connected in series and the wiring for one level. The other levels may be of absolutely identical design permitting a converter for a predetermined voltage to be built with an appropriate number of levels without extra design and development costs.

BRIEF DESCRIPTION OF THE DRAWINGS

FIG. 1c is a plan view looking down along the line IC—IC of FIG. 1a.

FIG. 3b is a section along the lines IIIB—IIIB of FIG. 3a.

DETAILED DESCRIPTION OF THE PREFERRED EMBODIMENT

Figure 1A:
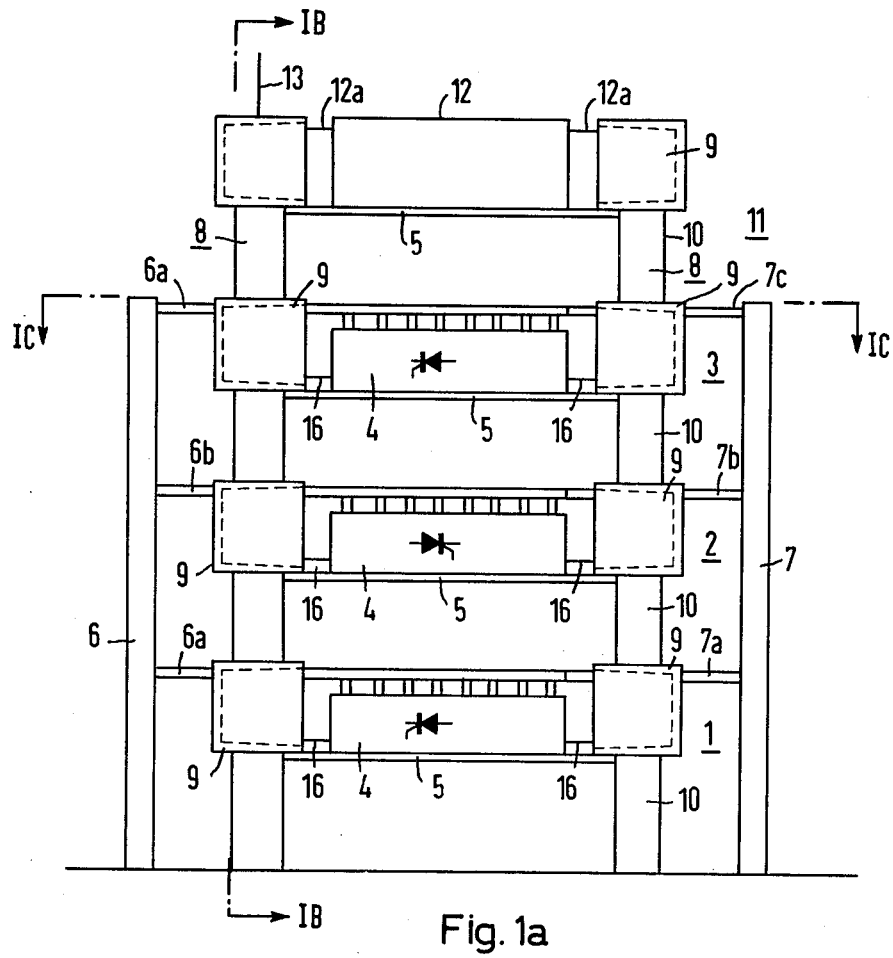
FIG. 1a is a front elevation view of a converter arrangement according to the present invention.
Figure 1B:
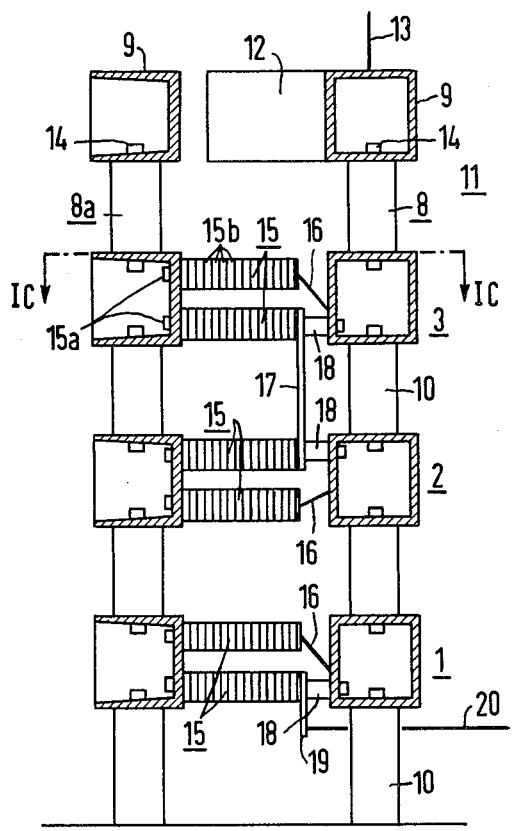
FIG. 1b is an end view partially in cross section taken along the line IB—IB.
Figure 1C:
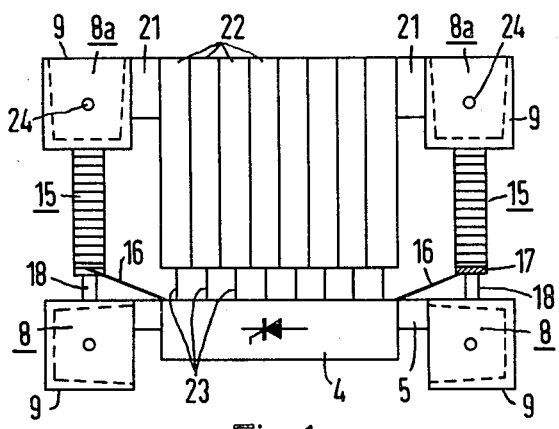

FIG. 1 illustrates an elevation view of the high voltage side of a converter according to the present invention. A plurality of the thyristor columns 4 are arranged on support rails 5 by stacking them in three levels designated 1, 2 and 3. Either air-cooled or liquid-cooled thyristor columns may be used such as those described in the above referenced German Offenlengungsschrifts. For purposes of discussion herein oil-cooled thyristor columns 4 will be used. Each level of the converter is supplied with coolant from a common oil supply line 6 with the separate levels being provided through tubes 6a, 6b and 6c respectively. The coolant flows from the tubes 6a, 6b and 6c to every cooling block of each thyristor in the thyristor columns 4. The heated coolant drains from the thyristors through tubes 7a, 7b and 7c into a common oil drainage line 7. For the sake of clarity the coolant inlet and outlet lines are omitted on FIGS. 1b and 1c.

On the high voltage side of the converter framework two support columns 8 made up of carriers 9 and vertical support elements 10 are provided. The vertical support elements 10 are of insulated material and typically may be commercial cast resin supports. The carriers 9 are cups made in a square shape in the illustrated embodiment. All of the carriers 9 or at the very least those which are to carry current may be made of an electrically well conducting material such as brass. The remainder of the carriers can be made of a metal having poor electric conductivity or of a nonconductive material. As is seen on FIG. 1a each support column 8 is equipped with a carrier 9 for each of the levels 1, 2 and 3. Attached to the carriers 9 are support or connecting rails 5 which support the thyristor stacks 4.

The converter of FIG. 1 has a further level designated 11 on which a subassembly 12 for fuses is supported on a support rail 5. The carriers 9 associated therewith carry the current to the fuse connection as indicated by the lines 12a and the current lead 13 for the converter.

FIG. 1b is a section along the lines IB—IB of FIG. 1a. It illustrates the shape of carriers 9 which will be discussed in more detail below in connection with FIGS. 3a and 3b and shows the connection of the carriers 9 with the cast resin support elements 10 using screws 14.

The section of FIG. 1b is taken in the bus bar plane of the converter and shows, in addition to the support column 8 for the high voltage side, a support column 8a for the side which will hereinafter be referred to as the low voltage side. The carriers 9 of the low voltage side support column 8a are fastened using current carrying screw bolts 15a of electrically conducting material. They are connected through line 16 to the thyristor column 4 of the same level or through a bus bar 17 to a screw bolt 15a associated with the next level. Annular ferrite cores 15b are pushed over the screw bolts 15a. The screw bolts 15a and the ferrite cores 15b form cut-off chokes 15 representing a part of the circuit components of the thyristor stack 4 for each level. The bus bars 17 are screwed through spacers 18 made of insulating materials to the carriers 9 of a support column 8 of the high voltage side. This completes and strengthens the framework. Also illustrated schematically on FIG. 1b is a current lead 20 connected through a bar 19 to a cut-off choke 15 of the lower level 1.

FIG. 1c is a section along the line IC—IC of FIG. 1a. The framework made up of the high voltage side support columns 8 and low voltage side support columns 8a is rectangular with the corners of the framework for the converter formed by the support columns 8 and 8a. The carriers 9 of the low voltage side support columns 8a are interconnected on each level by connecting rails 21 of insulating material. Mounted on the connecting rails 21 of each level are activation and circuit component groups 22. One such activation and circuit component group 22 is provided for every thyristor of the thyristor stack 4. It is indicated schematically on FIG. 1c that each activation and circuit component group 22 is coupled to a thyristor of the thyristor column 4 through a line 23. In general the activation and circuit component groups 22 each contain a pulse amplifier and a pulse transmitter for transmission of the firing pulse for its associated thyristor and the energization of resistors and capacitors forming part of the respective thyristor circuits. It should also be noted that the holes 24 used for screwing each of the carriers 9 to a cast resin support 10 are visible in FIG. 1c.

The electrical wiring of the thyristor stack 4 of the converter shown on FIGS. 1a, 1b and 1c may be that of a bridge branch of a three phase bridge for example. The wiring of one level is illustrated by FIG. 1c. One cut-off choke 15 from each of the low voltage side supports is connected to the thyristor stack 4 through a line 16. FIG. 1b illustrates that both cutloff chokes 15 of each carrier 9 on the low voltage side support column 8a are connected electrically through the carrier 9. Thus, two cut-off chokes 15 precede and succeed each thyristor stack 4 in each of the levels 1, 2 and 3. The levels 1, 2 and 3 are interconnected electrically through bus bars 17 which are disposed between the cut-off chokes 15 of adjacent levels as illustrated on FIG. 1b. A bus bar 17 also goes from the fuse level 11 to the last cut-off choke of the preceding level 3. Voltage is applied to the entire arrangement through the lines 13 and 20 illustrated on FIG. 1b.

Figure 2:
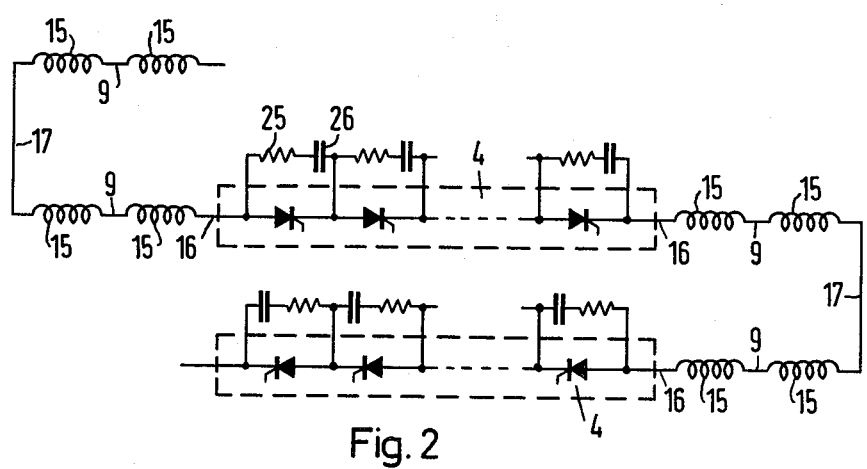
FIG. 2 is an electrical schematic of the thyristor arrangement of FIGS. 1a – 1c.

The general wiring diagram of two adjacent levels is shown on FIG. 2. The cut-off chokes 15, connected to each other through a carrier 9 and preceding or succeeding each thyristor column 4 in a level are connected to the cut-off chokes 15 of the succeeding or preceding level through bus bars 17. Thus, this wiring arrangement provides for the series connection of the thyristor stacks 4 of all levels. As a matter of course, this series connection may also be replaced by a parallel connection of the thyristor stacks of the various levels. Alternatively the thyristor stack of each level can be one bridge branch of a converter bridge. Whatever the wiring arrangement, the structure of the various levels does not need be changed. FIG. 2 also shows the resistors 25 and capacitors 26 which make up part of the individual RCL circuits for the thyristor of the thyristor stack 4. These will be contained in the activation and circuit component groups 22 of the converter.

In summary it should be emphasized that the converter of the present invention provides a building block system assuring a simple design of the converter. Identical carriers 9 differing only in the location size of the holes require for the screw connection with other components are used to accommodate the thyristor columns 4, the activation and circuit component groups 22, the bus bars 17 and the required ferrite cores 15b along with the fuses. The carriers not only perform the function of carrying the load of the levels 1, 2 and 3 arranged one on top of the other but a portion of them serve at the same time to carry current and also serve as current-carrying fasteners for circuit components such as the cut-off chokes 15. This permits arriving at a very compact and inexpensive design since additional insulation is unnecessary. In addition, as is illustrated particularly well by FIG. 2, a uniform distribution of ferrite cores 15b and, with them the cut-off chokes 15 over the entire series connection of the thyristor columns 4 is obtained. In this regard it should be noted that cut-off chokes 15 may also be screwed to the carriers 9 of the support columns 8a in the fuse level 11 if required.

At the fuse level 11 the carriers also perform the function of carrying current to the fuse connection. This makes it possible to partially eliminate the interposition of insulating supports.

The potential separation of the levels 1, 2 and 3 is accomplished through the use of cast resin support elements 10. Insulation from ground potential is accomplished in the same manner using support elements 10 fastened to a base frame, for example. With this arrangement the supply voltage applied to the lines 13 and 20 depends only on the number of levels disposed in equal divisions one on top of the other and is not dependent on the insulation to ground potential. As a result the admissible supply voltage is variable with the number of levels. Furthermore the structure of the individual levels does not have to be changed as voltages change.

Figure 3A:
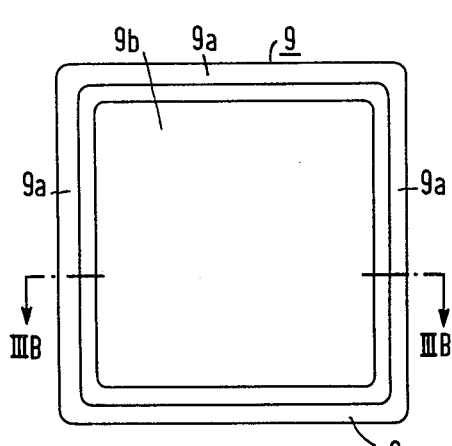
FIG. 3a is a plan view illustrating a cavity in the cup like carriers used in FIGS. 1a–c.
Figure 3B:
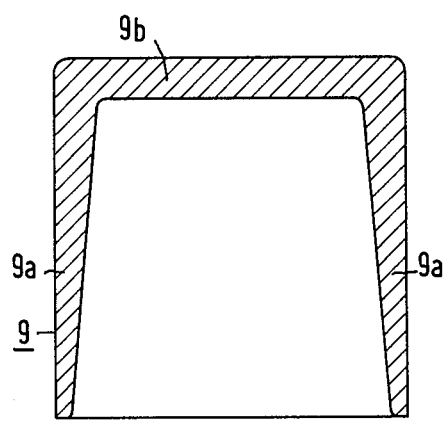

FIGS. 3a and 3b illustrate a carrier 9 in more detail, FIG. 3a being a plan view showing the cavity of a cup-like carrier and 3b a section along the line IIIB—IIIB of FIG. 3a. In the illustrated embodiment the carrier is of a square shape with four flat sidewalls 9a and a plane bottom plate 9b. Clearly the carrier may be of another geometric shape such as that of a hexagon if such is necessary for design reasons. In the illustrated embodiment the sidewalls 9a have an inside taper to make casting easier, where carrier 9 is produced by casting. With this design it is possible to make all screw connections with commercial beveled square washers as long as the insides of the legs or sidewalls 9a are provided with an inclination of approximately 8°.

Holes may be provided anywhere in the sidewalls 9a and in the bottom plate 9b. This permits a great variety and of design possibilities for converters permitting the carriers 9 to be attached to supports 8 and 8a in different positions. In this connection it should also be emphasized that, due to the shape of the carrier, every screw connection remains accessible even after assembly of all the levels. This facilitates the servicing and the assembly of the converter of the present invention considerably.

In summary, it can be stated that with the converter according to the present invention a building block system has been devised which makes possible, using simple mass producible components, a simple design which can be easily modified in many ways and with which converters for different voltages can be built, all in accordance with a uniform design principle. Not only is the design of different converters facilitated but their assembly and maintenance is also made easier without additional difficulties. Thus, an improved converter structure has been shown. Although specific embodiments have been illustrated and described, it will be obvious to those skilled in the art that various modifications may be made without departing from the spirit of the invention which is intended to be limited solely by the appended claims.

What is claimed is:

1. In a converter having series connected thyristors assembled, together with circuit components, in a framework containing a plurality of support columns, wherein the improvement comprises support columns having:
    a. at least one carrier in the form of a cup with a plurality of flat side surfaces and a bottom in each column;
    b. vertical support elements of an electrical insulating material making up a portion of each column;
    c. screws connecting said carriers to said vertical support elements; and
    d. at least one of the carriers being made of electrically conducting material and being connected in the series circuit so as to carry current.

2. A converter according to claim 1 wherein each carrier is of an essentially square shape.

3. A converter according to claim 2 wherein the inside surfaces of the sidewalls of the carriers are tapered such that the cross section of the cup is greater at the edge of the cup than at the bottom of the cup.

4. A converter according to claim 1 wherein the series connected thyristors are divided into groups disposed in several levels one on top of each other and wherein each support column has a carrier for each level with the carriers of each support column mechanically coupled to each other through said vertical support elements of electrically insulating material.

5. A converter according to claim 4 wherein each carrier is of an essentially square shape.

6. A converter according to claim 5 wherein the inside surfaces of the sidewalls of the carriers are tapered such that the cross section of the cup is greater at the edge of the cup that at the bottom of the cup.

7. A converter according to claim 6 wherein said carriers are metal castings.

8. A converter according to claim 1 and further including coupling between the current carrying carriers and circuit components, said couplings being made with screw connection.

9. A converter according to claim 8 wherein fuses are provided in said converter and wherein at least one current carrying carrier is coupled to said fuses.

* * * * *